United States Patent [19]
Palchan et al.

[11] Patent Number: 4,645,620
[45] Date of Patent: Feb. 24, 1987

[54] INTERCALATION COMPOUNDS OF GRAPHITE

[76] Inventors: Israel Palchan, Givon 8/3, Givon; Dan Davidov, Neve/Shanan 18; Henry Selig, Ahad Ha'am 16, both of Jerusalem, all of Israel

[21] Appl. No.: 564,258

[22] Filed: Dec. 22, 1983

[30] Foreign Application Priority Data

Jan. 10, 1983 [IL] Israel ........................................ 67645

[51] Int. Cl.$^4$ .............................................. H01B 1/06
[52] U.S. Cl. ..................................... 252/502; 252/506
[58] Field of Search .............................. 252/502, 506; 260/429 R

[56] References Cited

U.S. PATENT DOCUMENTS

| | | | |
|---|---|---|---|
| 3,409,563 | 11/1968 | Olstowski | 252/506 |
| 3,956,194 | 5/1976 | Armand | 252/506 |
| 3,962,133 | 6/1976 | Rodewald | 252/433 |
| 4,036,786 | 7/1977 | Tiedemann | 252/502 |
| 4,414,142 | 11/1983 | Vogel et al. | 252/506 |
| 4,461,719 | 7/1984 | Vogel et al. | 252/506 |
| 4,477,374 | 10/1984 | Watanabe et al. | 252/506 |

OTHER PUBLICATIONS

Leonard H. Cohan and James F. Mackey, "Conductivity of Rubber Tread Stocks," *Industrial and Engineering Chemistry*, 35: 806 (1943).

Kirk-Othmer, *Encyclopedia of Chemical Technology*, Third Ed., vol. 4, pp. 591 and 592.

Raman Scattering in Low Stage Compounds of Graphite Intercalated with AsF$_5$, HNO$_3$ and SbCl$_5$, P. C. Eklund et al., Dept. of Physics and Astronomy, University of Kentucky, Lexington, KY 40506, May 24, 1979.

Raman Scattering of Stage 2 Graphite Fluorine Intercalation Compounds, I. Ohara et al., Racah Institute of Physics, The Hebrew University of Jerusalem, Apr. 25, 1985.

*Primary Examiner*—A. Lionel Clingman
*Assistant Examiner*—Hoa Van Le
*Attorney, Agent, or Firm*—Townsend and Townsend

[57] ABSTRACT

The invention provides a graphite fluorine intercalation product of the formula $C_xF$ wherein $x \geq 5.5$, said product having a basal plane conductivity greater than $10^5$ cm$^{-1}\Omega^{-1}$. The invention also provides a process for producing the above product comprising exposing highly oriented pyrolitic graphite to a fluorine atmosphere in a sealed system under pressure.

4 Claims, No Drawings

INTERCALATION COMPOUNDS OF GRAPHITE

The present invention relates to intercalation compounds of graphite. More particularly, the present invention relates to intercalation compounds of graphite and fluorine exhibiting high conductivity.

As far as can be determined there is no report existing to date about graphite-Fluorine intercalation compounds exhibiting high conductivities. The only known chemical compounds between fluorine and graphite are CF, $C_2F$ and $C_4F$. These are compounds which are prepared at high temperatures and/or relatively high pressures and are basically insulators. Although these compounds are electrical insulators, they have received considerable attention as the main components of electrodes of electrochemical batteries. This is mainly due to the high concentration of fluorine in the materials and unquestionably a fluorine/graphite intercalation product exhibiting high conductivity should be of special interest and use as a conductor, an electrode for batteries as well as for the other uses to which known intercalation compounds as well as graphite/fluorine compounds have been suggested and used.

As reported and explained by Lawrence B. Ebert in Annual Review of Materials Science, Vol. 6, 1976, pp. 181-211, intercalation is the insertion of ions, atoms or molecules into the interplanar voids of a lamellar structure without destruction of the host's layered bonding network and hundreds of intercalation products of graphite have been reported to date.

Thus graphite has been intercalated with alkali metal compounds such as potassium, rubidium and cesium, with acid salts, e.g., of sulfuric, chlorosulfonic, fluorosulfonic, selenic, perchloric and nitric acid and with metal halides.

Unlike the preceding classes of lamellar compounds of graphite Ebert reports on pages 193-196 (ibid) that the graphite/halogens are not a homogeneous grouping of materials, varying both in method of synthesis and in resulting compound properties. Thus, e.g., there is no evidence for a graphite/iodine intercalation compound, the existence of a graphite/chlorine compound is tinged with controversy and only graphite/bromine intercalation compounds have in fact been found and studied.

With regard to fluorine, fluorine is recognized as being different from other halogens because of its small size, low bond energy and its high reactivity and tendency to readily unite covalently with carbon and graphite.

Therefore it was heretofor believed and reported in the literature that graphite and fluorine can unite to form only covalent compounds, such as the well known graphite monofluoride, because of the high reactivity of fluorine. Said resulting compounds have been reported as being non-conducting insulators.

Thus as described by Serge Flandrois in Synthetic Metals 4 (1982) p. 255-266 at 260 "The reaction of fluorine gas with graphite can lead to several well-defined compounds according to the reaction temperature: at 600°-640° C. the monofluoride CF is obtained, whereas fluorination at 350°-400° C. yields $C_2F$. A third variety of graphite fluoride of formula $C_4F$ may also be prepared by fluorinating graphite with a mixture of fluorine and hydrogen fluoride." As indicated, however, by Ebert, p. 194 (ibid) the conductivity of said tetracarbon monofluoride was lower than graphite by a factor of 100.

In contradistinction to said reports and expectations based on the prior art it has now been surprisingly discovered that it is possible to produce graphite-fluorine intercalation compounds exhibiting conductivities higher than that of the parent graphite.

Even more surprisingly it was found that it is possible to produce graphite-fluorine intercalation products having a specific conductivity i.e. a conductivity per unit weight greater than that of copper.

Thus according to the present invention, there is now provided a graphite fluorine intercalation product of the formula $C_xF$ wherein $x \geq 5.5$ and said product has a basal plane conductivity greater than $10^5 \text{ cm}^{-1}\Omega^{-1}$.

While, as will be described hereinafter many such intercalation compounds can now be prepared according to the present invention, preferred are intercalation products wherein x is less than 100 and especially preferred are such products wherein x is greater than 6 and less than 50 as exemplified hereinafter having a basal plane specific conductivity greater than $6.6 \times 10^4$.

According to the present invention there is also provided a method for producing a graphite fluorine intercalation product of the formula $C_xF$, wherein $X \geq 5.5$ and said product has a basal plane conductivity greater than $10^5 \text{ cm}^{-1}\Omega^{-1}$ comprising exposing highly oriented pyrolitic graphite to a fluorine atmosphere in a sealed system under pressure.

As will be realized, in such a method, reaction is a function of pressure and time and thus the pressure used can vary greatly. Preferrably, for reasonable reaction times, pressure can vary between about 50 mm/Hg and 100 atmospheres and especially preferred is a pressure of between about 300 and 2000 mg/Hg.

It has further been found that improved results are achieved when said reaction is carried out in the presence of a minor amount of a catalyst selected from the group consisting of elements whose fluorides from intercalation compounds with graphite, fluorides thereof and compounds thereof which undergo disassociation in the presence of fluorine to form such fluoride compounds, and amounts of up to 0.05% and even 0.01% have been found to be sufficient to achieve the desired enhancement of reaction.

Preferably said graphite is reacted with said fluorine in the presence of a minor catalytic amount of a fluorine compound which itself can form an intercalation compound with graphite such as a fluorine compound selected from the group consisting of $AsF_5$, $PF_5$, $OsF_6$, $GeF_4$, $SbF_5$ and $IrF_6$ or with an element forming such a fluoride.

While the invention will now be described in connection with certain preferred embodiments in the following examples it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars described are by way of example and for purposes of illustrative discussion of preferred embodiments of the present invention only and are presented in the cause of providing what is believed to be the most useful and readily understood description of procedures as well as of the principles and conceptual aspects of the invention.

EXAMPLES 1–4

General Procedure $C_xF$ ($x \geq 5.5$) intercalation compounds were prepared at room temperature by exposing highly oriented pyrolitic graphite (HoPG) to a fluorine atmosphere. The fluorine pressure was between 300 mmHg and 1500 mmHg and the preparation was carried out in a sealed system made of Kel-F tubes and Nickel. The fluorine, in various stages of purity, was introduced into the system after evacuation. The rate of the intercalation process, between several hours up to a month, varied in accordance with the partial pressure of $F_2$ and the presence of catalysts such as the fluorine compounds: $AsF_5$, $PF_5$, $IF_5$, $OsF_6$, $GeF_4$, $SbF_5$, $IrF_6$ etc .... Also the presence of As, P, I, Os, Ge, Sb, which tend to form these type of compounds in the presence of $F_2$, accelerated the reaction between the fluorine and the HOPG samples. The percentage of such catalysts used to accelerate the reaction was less than 0.01%.

Prior to the chemical reaction, the weight as well as the thickness of the HoPG sample were determined.

The weight uptakes yield the chemical formulae set forth in Table I. Several samples were checked with a microprobe (EPMA), the results yield roughly (within 10%) the same concentration of fluorine as determined by the weight-uptake.

The $C_xF$ samples were sealed in a special sample holder inside the dry-box (Nitrogen atmosphere) for X-ray characterization. X-ray diffractometry yields the (001) reflections of the sealed samples as set forth in Table I.

X-ray and conductivity measurements were carried out also after exposure of the samples to the atmosphere for ten hours. No significant change in X-ray patterns nor in the conductivity were found. Several of the samples exhibit remarkable stability even after heating up to 100° C. in the atmosphere for several hours. It is therefore concluded that the new HoPG-Fluorine intercalation compounds are more stable in air than most known intercalation compounds.

X-ray data, lattice constants, stage of intercalant, density, conductivities, etc. of compounds studied are given in Table I.

TABLE I

| Compounds No. | 2θ Values and the correspondence (002) reflections | | | | | | | Lattice constant d(Å) | Stage & its % | Change of Mass after intercalation M/M HOPG | Ratio sample thickness W/W HOPG | Conductivity relative to that of HOPH σ/σ HOPG | Relative Density | Specific conductivity σ/σ HOPG |
|---|---|---|---|---|---|---|---|---|---|---|---|---|---|---|
| | 9.5 | 18.8 | 28.0 | 48.3 | 59.1 | 72.5 | 82.5 | | | | | | | |
| 1 | 9.5 (001) | 18.8 (002) | 28.0* (003) | 48.3 (005) | 59.1 (006) | 72.5 (007) | 82.5 (008) | 9.34 | II-100% | 1.26 ($C_{6.15}F$) | 1.38 | 8/9 | 0.91 | 9.8 |
| 2a | | 22.5 (006) | 26.84* (007) | 52 (0013) | 55.5 (0014) | | | 23.34 | VI-80% | | | | | |
| b | | 24.8 (007) | 27.4* (008) | 53.3 (0015) | 56.8 (0016) | | | 26.17 | VII-12% | 1.05 ($C_{13}F$) | 1.18 | 7.2 | 0.89 | 8.1 |
| c | | 26.3 | | 54.4 | | | | | HOPG-8% | | | | | |
| 3a | 14.7 (0,0,2) 66.8 (009) | 21.7 (003) | 28.8* (004) | 36 (005) | 50.8 (007) | 58.7 (008) | | 12.78 | III-60% | 1.26 ($C_{5.9}F$) | 1.38 | 11.1 | 0.92 | 12 |
| b | 9.8 (001) | 19.2 (002) | 28.8* (003) | 49.1 (005) | 59.5 (006) | | | 9.36 | II-40% | | | | | |
| 4a | 14.3 (001) | 27.9* (002) | 57.2 (004) | | | | | 6.51 | I-70% | 1.14 ($C_{11.6}F$) | 1.46 | 8.2 | 0.78 | 12.2 |
| b | 23.3 (004) | 28.3* (005) | 52.2 (009) | | | | | 16.05 | IV-30% | | | | | |

The conductivity of the samples was measured before, during and after the process of intercalation using a contactless m.f. technique at room temperature. After the intercalation process, the samples were transferred to a dry-box for weight and thickness measurements.

TABLE II

Comparison of conductivities and specific conductivities for Al, Cu, HOPG and $C_xF$ ($x \geq 6$). For the last two materials the conductivity is along the basal planes ($x \geq 6$).

| | Al | Cu | HOPG | $C_xF$ (x - 6) |
|---|---|---|---|---|
| Conductivity, σ (ohm cm)$^{-1}$ | $3.6 \times 10^5$ | $5.9 \times 10^5$ | $2.4 \times 10^4$ | $(1.2–2.7) \times 10^5$ |
| Specific density, ρ (g/cm$^3$) | 2.7 | 8.95 | 1.8 ÷ 2.0 | 1.5 ÷ 1.9 |
| Specific Conductivity, σ* σ* = σ/α $\frac{(ohm\ cm)^{-1}}{gram\ cm^{-3}}$ | $1.3 \times 10^5$ | $0.66 \times 10^5$ | $(1.2 \div 1.3) \times 10^4$ | $7 \times 10^4 \div 1.5 \times 10^5$ |
| Normalized specific conductivity with respect to HOPG σ*/σ* HOPG | 10 ÷ 11 | 5 | 1 | 6 ÷ 12 |

The results in Tables I and II clearly indicate that the $C_xF$ compounds exhibit a layered periodic structure typical of intercalated-graphite compounds. The "distorted" graphite layers spacing, c, (c−d(n−1)3.35) is of the order of 6 Å and 6.5 Å, depending on the stage of the intercalation process wherein is the stage and d is the lattice spacing. The relative changes in the thickness volume of the samples, after the intercalation process, is larger than the proper changes of their weight due to $F_2$ absorption. Thus, absorption of $F_2$ reduces the specific weight of the graphite samples. The basal plane conductivity is surprisingly high and the specific conductivity of the $C_xF$ compounds, namely, the conductivity per unit-weight is larger than that of pure copper at room temperature (For copper $\sigma = 5.9 \times 10^5$ $\Omega^{-1}cm^{-1}$ and the specific weight $\sigma = 8.9$ qr/cm$^3$) and some preferred compounds have specific conductivity even greater than that of aluminum. The importance of these compounds is thus self-evident; they can be used for electrical conductivity in various applications, as they are lighter and might be cheaper than conventional electrical conductors.

It will therefore be realized that the compounds of the present invention can be used as electrodes especially for batteries instead of electrodes composed of $CF$, $C_2F$ and $C_4F$ which are non conducting, but which have already found such industrial use.

EXAMPLE 5(a)

Following the procedure described hereinbefore HoPG was reacted with a fluorine atmosphere in a sealed system at a pressure of 900 mm/Hg. and conductivity relative HoPG was measured periodically with the following results: 0.0 hr—1; 0.5 hr—1.23; 1 h—1.7; 2 h—1.9; 24 h—3.1.

EXAMPLE 5(b)

The procedure of example 5(a) was repeated while introducing into the system 2 mm/HgIF$_5$ as a catalyst with the following results: 0.0 hr—1; 0.5 hr—1.45; 1 hr—2.3; 2 hr—3.2; 24 hr—14.6.

EXAMPLE 6(a)

Following the procedure described hereinbefore HoPG was reacted with a fluorine atmosphere in a sealed system at a pressure of 1450 mm/Hg and conductivity relative HoPG was measured periodically with the following results: 0.0 hr—1; 0.5 hr—2.25; 1 hr—2.3.

EXAMPLE 6(b)

The procedure of example 6(a) was repeated in a system having trace amounts of Os from a previous reaction with the following results: 0.0 hr-1; 0.5 hr-3.9; 1 hr-4.54.

It will thus be seen that while all of said examples produced intercalation compounds having conductivity higher than that of the original HoPG the presence of a minor amount of catalyst substantially reduced the time required to produce a product of improved conductivity properties under the same pressure conditions.

It will be evident to those skilled in the art that the invention is not limited to the details of the foregoing illustrative embodiments and examples and that the present invention may be embodied in other specific forms without departing from the essential attributes thereof, and it is, therefore, desired that the present examples be considered in all respects as illustrative and not restrictive, reference being made to the appended claims, rather than to the foregoing description, and all changes which comes with the meaning and range of equivalency of the claims are, therefore, intended to be embraced therein.

What is claimed is:

1. A graphite fluorine intercalation product of the formula $C_xF$ wherein $x \geq 5.5$, said product having a basal plane conductivity greater than $10^5$ cm$^{-1}\Omega^{-1}$.

2. A graphite fluorine intercalation product according to claim 1, wherein x is less than 100.

3. A graphite fluorine intercalation product according to claim 1, wherein $6 < x < 50$.

4. A graphite fluorine intercalation product according to claim 1, wherein said product has a specific conductivity greater than $6.6 \times 10^4$.

* * * * *